Jan. 18, 1966  W. F. JEHN  3,229,957
FORCE MULTIPLYING DEVICE
Filed June 15, 1962
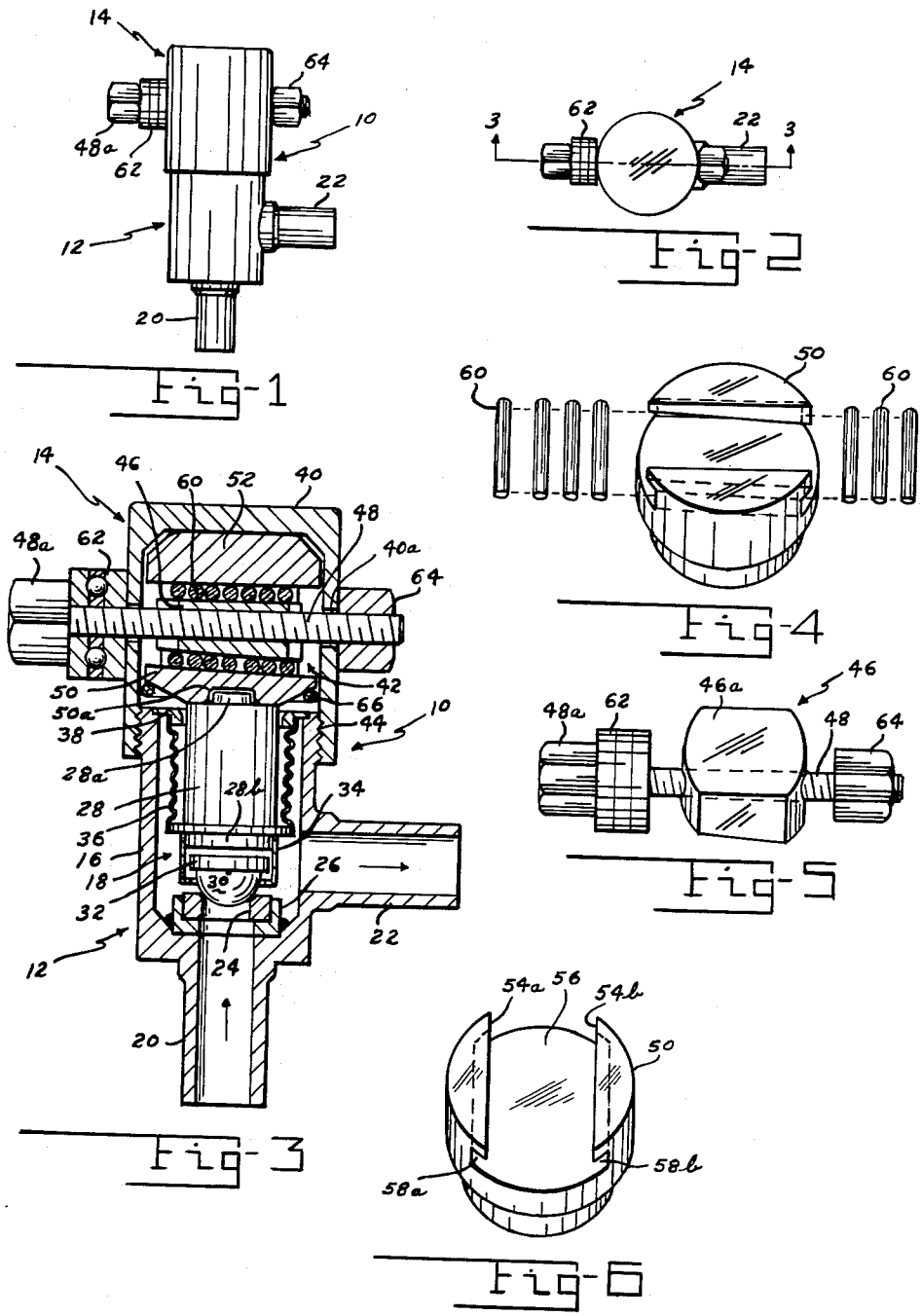
INVENTOR.
WERNER F. JEHN
BY
ATTORNEYS

United States Patent Office 3,229,957
Patented Jan. 18, 1966

3,229,957
FORCE MULTIPLYING DEVICE
Werner F. Jehn, 438 Twinning Drive, Dayton, Ohio
Filed June 15, 1962, Ser. No. 202,926
1 Claim. (Cl. 251—251)
(Granted under Title 35, U.S. Code (1952), sec. 266)

The invention described herein may be manufactured and used by or for the Government for governmental purposes without the payment to me of any royalty thereon.

This invention specifically relates to valves and sealing devices used in connection with pressure and vacuum systems subjected to high temperatures.

Typical applications of this invention are in the field of high vacuum work, in research in gaseous electronics, and in research with pure gases. In such research areas, there is a critical need for valves which can effectively seal off or isolate an evacuated system, or one containing gases of extreme purity to thereby prevent contamination.

Previous valves used in applications to which this invention pertains have suffered from one or more of the following disadvantages:

(1) The extremely high pressure of the plug against the seat, required to prevent seepage, could only be generated with considerable torque, and required valves which had to be bolted to a firm support, as against being supported by the piping or tubing to which they are connected.

(2) The leakage rate of the valves increased as the number of operating cycles increased; and (3) The extremely high pressure between the plug and seat produced distortion of the components, and resulted in very short-lived valves.

Bakable valves designed to withstand high temperatures are required on apparatus used to conduct work with high vacuum or with pure gases. The entire system, in order to prevent contamination must be "degassed" to drive out contaminants including such residual air or other gases which normally cling to the walls and other interior surfaces of the apparatus. The bulk of the contaminants may be driven out by heating the apparatus to a high temperature, say 500° C. for a predetermined time. On vacuum apparatus, all tubes, pipes and accessories should be as short as possible to produce the best flow characteristics, and a system which is easiest to decontaminate. For these reasons, valves are placed as near the main elements of the apparatus as possible. Since the interior of the valves must be included with the interior of the apparatus, the valves must also be heated for decontamination. The required ability to withstand high temperature definitely limits materials which may be used to construct valve components and eliminates any conventional materials normally used in valve construction.

The all-metal bakable valves presently in use, which have attempted to achieve low leakage rates, usually employ a soft metal seat which undergoes plastic deformation when a hard metal plug is pressed against it.

Experience has shown that usual valves of this type are satisfactory for only one closing, and that on subsequent closings, the rate of leakage will grow even though increasing pressure is applied to the valve plug.

The reason for the increasing leakage rate is that with the first valve closing, the soft metal seat is plastically deformed and workhardened by the extreme unit pressure applied by the plug. When the valve is again closed, the workhardened surface on the seat cannot be made to accommodate itself to the mating surface on the plug which inevitably is covered with microscopic crevices and roughness. If pressure on the plug is increased, the metal below the workhardened surface will yield and prevent the build up of enough pressure to produce a tight seal. If the soft seat is confined in a cavity within a harder metal body such as Monel or stainless steel, some improvement will result. However, if enough pressure is applied to influence the workhardened surface, this same pressure is sufficient to also produce structural deformation of the harder metal body backing up the soft seat.

The primary object of this invention is to provide an extremely compact and reliable bakable valve.

Another object of this invention is to provide a bakable valve having an actuating mechanism with large mechanical advantage in order to apply great thrust on the valve seat with a small amount of applied force.

A further object of this invention is to provide a bakable valve having an actuating mechanism in which the thrust is distributed over a large area in order to prevent the destruction or undue wear of actuating elements.

An additional object of this invention is to provide a bakable valve having an actuating mechanism comprising a minimum number of easily manufactured and rugged elements.

Additional objects, advantages and features of the invention reside in the construction, arrangement and combination of parts involved in the embodiment of the invention as will appear from the following description and accompanying drawings wherein:

FIG. 1 is a reduced scale elevation of the bakable valve;

FIG. 2 is a reduced scale plan view of the bakable valve;

FIG. 3 is a full scale sectional elevation along line 3—3 on FIG. 2 of the bakable valve, showing the valve plug in contact with the valve seat and before application of pressure by the actuating mechanism;

FIG. 4 is a perspective of the lower wedge plug and the roller bearings carried by the plug;

FIG. 5 is a perspective of the sliding wedge block, together with the actuating screw, thrust bearing and lock nut; and FIG. 6 is a perspective end view of the lower wedge plug showing the roller bearing retention grooves.

Referring to FIG. 1 and FIG. 3 which show a preferred embodiment of the invention, the bakable valve, referred to generally as valve 10, comprises a valve unit 12 and an actuating unit 14 which is detachably threaded to the valve unit. The thread fit is such as will permit hand engagement and disengagement without the use of tools.

Valve unit 12 has a valve body 16 made of a suitable ferrous alloy such as Kovar, a nickel-iron-cobalt alloy made by Union Carbide and capable of maintaining structural rigidity under repeated high temperature bakeouts. Valve body 16 is provided with chamber 18 which houses the working elements of the valve. Integral with valve body 16 and in direct communication with chamber 18 are inlet stem 20 and outlet stem 22. The stems are of suitable external and internal diameter for directly joining by welding or brazing into a flow line of the apparatus on which the valve is to be used. Normal flow through the valve during evacuation of the apparatus to which joined, is in the direction of the arrows on FIG. 3.

At the lower end of chamber 18 and coaxial with inlet stem 20, is valve seat member 24 which is brazed to carrier ring 26, which in turn is brazed to valve body 16. Valve seat member 24 is made from a tungsten carbide ring having a spherical valve seat faced with platinum foil. The seat facing, which, for purposes of illustration, is assumed to be platinum, may be made from foil of say .002 inch thickness and diffused under heat and pressure to a smoothly ground face of the valve seat member. It has been found from experience that an extremely satisfactory seat may be produced by placing the valve seat member 24 and the seat facing into a suitable holding fixture in which pressure may be applied to force the platinum foil against the tungsten carbide valve seat member; and, while the pressure is being applied, to heat the assembly for from one to two hours at 650° to 750° C. in an oven having a hydrogen or reducing atmosphere. Noble gases such as helium or argon would also provide a suitable atmosphere as well as inert gases such as nitrogen. The gases could also be used in combination. During the processing, the free face of the foil should be covered with a ball to which the platinum will not adhere. The ball, for which sapphire is a suitable material, gives assurance of providing a smooth and uniform valve seat. During the process of heating in the oven, the platinum foil will become firmly bonded or diffused to the tungsten carbide.

The carrier ring 26 is also made of Kovar, an alloy having very nearly the same coefficient of expansion as tungsten carbide. The use of the Kovar carrier ring is desirable because it would be difficult to braze the tungsten carbide valve seat member directly into the blind valve seat body after the platinum foil is diffused to the tungsten carbide. The preheat temperature of tungsten carbide is much higher than for Kovar, and such temperature would endanger the platinum foil. It has been found to be entirely satisfactory to first braze the tungsten carbide valve seat 24 to the Kovar carrier ring 26, and then at a lower temperature to braze the carrier ring to the valve body. In actual fabrication, the tungsten carbide valve seat is first brazed to the Kovar carrier ring, then the platinum foil is diffused in place in accordance with the process of the above-referenced co-pending application, and, finally, the the Kovar carrier ring is brazed to the Kovar valve body at a temperature sufficiently low to not damage the platinum foil.

The valve plug assembly operable within valve body 16 comprises a stem 28, a hemispherical valve plug 30 joined to a disk 32 and a retainer means or ferrule 34. The hemispherical valve plug 30, which is preferably made of tungsten carbide, has its flat face brazed to one face of disk 32. The ferrule 34, which is joined to stem 28, is of such size as to cage disk 32 with attached plug 30 while permitting a limited amount of free axial and lateral motion of the plug and disk. The free end of stem 28 terminates in a reduced diameter 28a, which is loosely guided within counterbore 50a in the bottom face of lower wedge plug 50. Thrust from the actuating unit 14 is applied to stem 28 in a manner to be hereinafter described.

The valve plug assembly is mechanically joined to the valve body 16 by means of a bellows 36 and a ring member 38. The flange of ring member 38 is continuous brazed to valve body 16 to provide a leak proof juncture. The lower end of bellows 36 is continuous brazed to stem 28, as shown on FIG. 3 and the upper end of the bellows is likewise brazed to the ring 38 as shown. The ring member 38 has an internal diameter providing a loose guide for the upper end of stem 28. The bellows may be biased to hold the valve plug assembly in a normally open position.

When the valve is in its normally open position, the valve stem 28 will extend from the body sufficiently to permit the ferrule 34 to lift the valve plug 30 from the seat. When the valve is closed, the disk 32 is free to move laterally and axially within the ferrule and the hemispherical plug 30 is free to find its own normal seat, both laterally and in tilt. As the valve stem 28 closes sufficiently to allow the lower squared end 28b of the stem to contact disk 32, any tilt will be removed, and holding thrust will be applied with the upper surface of the disk squarely against end 28b of the stem. It is noted that, unlike valves having a valve plug firmly guided and in fixed relationship to the valve seat, the valve plug of the present valve is free to rotate, is free to tilt and is free to move laterally in relationship to the valve seat.

The actuating unit, which translates relatively low applied torque into linear force of great magnitude, has an actuating body member 40 containing a closed end cylindrical chamber 42. The open end of actuating body member 40 terminates in internal threads 44, which engage like external threads on valve body 16. The chief elements of the actuating or force multiplying mechanism comprise a taper wedge block 46 mounted on an actuating screw 48, a lower wedge plug 50 and an upper wedge plug 52.

As illustrated on FIG. 5, wedge block 46 has an upper face 46a parallel to the longitudinal axis through actuating screw 48 and a similar lower face at an angle to the axis of the actuating screw. The upper wedge plug 52 and the lower wedge plug 50 are the same in general form, having only one significant difference to be described below. For convenience, the description of lower wedge plug 50 will also be generally applicable to the upper wedge plug 52.

Referring to FIG. 4 and FIG. 6, lower wedge plug 50 is made of heat treated steel with all working surfaces ground. The diameter of the plug is such as to provide a free fitting fit within the closed end chamber 42 of body member 40. The lower face of the plug, which is normal to the axis, is ground to provide a smooth bearing surface against stem 28. The upper face of the plug is recessed with a cavity having two opposing parallel sides 54a and 54b which act as ways in which the taper wedge block 46 operates. The bottom face 56 of the cavity is at an angle with the axis of the plug to be parallel with the lower face of taper wedge block 46 as best shown on FIG. 3. As best shown on FIG. 4 and FIG. 6, the plug 50 has undercuts 58a and 58b which are parallel to ways 54a and 54b and to bottom face 56 to provide means for axially retaining roller bearings 60 shown on FIG. 4. Bearings 60 provide antifriction surfaces between taper wedge block 46 and plugs 50 and 52.

The only functional difference between the lower wedge plug 50 described above and the upper wedge plug 52 is in the bottom face of the cavity. While the bottom face 56 of the lower wedge plug is at an angle to be parallel to the lower face of the wedge block 46, the like bottom face in the upper wedge plug is normal to the axis of the plug to provide a surface parallel to the upper face of the wedge block.

Wedge block 46 is actuated to and fro within actuating body member 40 by means of actuating screw 48, which extends through the body by passing through opposing holes 40a in the walls of the body. Actuating screw 48 terminates at one end in head 48a for receiving a wrench with which the screw may be actuated. Between head 48a of actuating screw 48 and body 40 is a friction reducing thrust bearing 62. Lock nut 64 engages the free end of the actuating screw and may be firmed to stabilize the unit. A snap ring 66, or other means well known to the art may be used to prevent the lower wedge plug 50 from becoming disengaged when the actuating unit 14 is unscrewed from valve unit 12.

In operation, the valve is closed by turning the actuating screw to move the wedge block to the left, as shown on FIG. 3. This motion causes the lower wedge plug to axially move downward on the cylindrical axis of the cylindrical closed end chamber and apply thrust against stem 28 which, in turn, moves downward to close the hemispherical valve plug against its seat. The mechanical advantage of the actuating or force multiplying unit is such that a tremendous force may be applied to the valve plug with very little applied torque to the actuating screw. When it is necessary to evacuate and bake-out the apparatus on which the valve is used, the actuating screw is turned in the opposite direction to move the sliding wedge to the right and thereby remove the thrust from stem 28. The actuating unit 14 is then unscrewed from the valve unit 12 and the plug in the valve unit is free to lift from its seat.

It is to be understood that the embodiment of the present invention as shown and described is to be regarded as illustrative only and that the invention is susceptible to variations, modifications and changes within the scope of the appended claim.

I claim:

A force multiplying device for converting torque into linear force comprising a body member having a cylindrical closed end chamber, a wedge block within the cylindrical chamber of said body member, an actuating screw rotatably supported by said body member and passing through said cylindrical chamber normal to the cylindrical axis, said actuating screw theadably engaging said wedge block for moving said wedge block along the axis of said actuating screw, said wedge block having a first face parallel to the axis of said actuating screw and a second face at an angle to the axis of said actuating screw, a first wedge plug within and against the bottom of said cylindrical closed end chamber and having a face in parallel spaced relationship to the first face on said wedge block, bearings disposed between said wedge block and said first wedge plug, a second wedge plug having a taper face matching with and in spaced relationship to the second face on said wedge block, and bearings disposed between said wedge block and said second wedge plug, said second wedge plug being axially movable within the cylindrical chamber of said body member for translating the movement of said wedge block into linear movement along the cylindrical axis of the cylindrical chamber in said body member.

References Cited by the Examiner

UNITED STATES PATENTS

| 660,872 | 10/1900 | Taylor | 251—234 X |
| 1,693,257 | 11/1928 | Shield | 251—86 |
| 1,705,139 | 3/1929 | Rigal | 251—263 X |
| 1,939,128 | 12/1933 | Meyer | 251—86 X |

FOREIGN PATENTS

| 1,095,150 | 3/1954 | France. |
| 1,241,293 | 8/1959 | France. |
| 1,013,664 | 8/1957 | Germany. |

OTHER REFERENCES

"Rotary to Linear Motion" (Ball) published by Product Engineering, April 2, 1962 (pages 1 and 2 relied on), Class 74, Subclass 89.

ISADOR WEIL, *Primary Examiner.*

D. ROWE, D. MATTHEWS, *Examiners.*